United States Patent
Fujitsu et al.

(10) Patent No.: US 11,061,130 B2
(45) Date of Patent: Jul. 13, 2021

(54) RADAR APPARATUS AND TARGET DETECTING METHOD

(71) Applicant: DENSO TEN Limited, Kobe (JP)

(72) Inventors: Seiya Fujitsu, Kobe (JP); Shinya Aoki, Kobe (JP)

(73) Assignee: DENSO TEN Limited, Kobe (JP)

( * ) Notice: Subject to any disclaimer, the term of this patent is extended or adjusted under 35 U.S.C. 154(b) by 355 days.

(21) Appl. No.: 16/360,551

(22) Filed: Mar. 21, 2019

(65) Prior Publication Data

US 2019/0377081 A1  Dec. 12, 2019

(30) Foreign Application Priority Data

Jun. 11, 2018 (JP) .............................. JP2018-111083

(51) Int. Cl.
| | |
|---|---|
| *G01S 13/58* | (2006.01) |
| *G01S 13/34* | (2006.01) |
| *G01S 7/40* | (2006.01) |
| *G01S 7/35* | (2006.01) |
| *G01S 13/931* | (2020.01) |

(52) U.S. Cl.
CPC ............ *G01S 13/584* (2013.01); *G01S 7/352* (2013.01); *G01S 7/40* (2013.01); *G01S 13/34* (2013.01); *G01S 13/931* (2013.01); *G01S 7/356* (2021.05)

(58) Field of Classification Search
CPC .... G01S 13/931; G01S 13/584; G01S 13/345; G01S 13/34; G01S 13/524; G01S 13/288; G01S 13/60; G01S 7/415; G01S 13/92; G01S 7/412; G01S 13/588; G01S 2013/93271
See application file for complete search history.

(56) References Cited

U.S. PATENT DOCUMENTS

| | | | | |
|---|---|---|---|---|
| 6,675,094 | B2* | 1/2004 | Russell ................. | G01S 13/931 701/301 |
| 6,731,235 | B2* | 5/2004 | Kishida ................ | G01S 13/931 342/128 |
| 2004/0041727 | A1* | 3/2004 | Ishii ..................... | G01S 13/584 342/109 |
| 2017/0010302 | A1* | 1/2017 | Steurer ................. | G01S 11/12 |
| 2020/0132827 | A1* | 4/2020 | Marsch ................ | G01S 13/931 |
| 2020/0191941 | A1* | 6/2020 | Marsch ................ | G01S 13/72 |
| 2020/0241124 | A1* | 7/2020 | Fei ....................... | G01S 13/88 |
| 2021/0003695 | A1* | 1/2021 | Akamine .............. | G01S 7/352 |

FOREIGN PATENT DOCUMENTS

JP  2002-014165 A  1/2002

* cited by examiner

*Primary Examiner* — Olumide Ajibade Akonai
(74) *Attorney, Agent, or Firm* — Oliff PLC (57) ABSTRACT

A radar apparatus includes: a detection portion that transmits a radio wave to a target and receives a radio wave reflected on the target so as to detect instantaneous data; and an allocation portion that allocates the instantaneous data to prediction data of the target so as to take continuity of the target; and the allocation portion corrects velocity of the instantaneous data and velocity of the prediction data respectively as velocities made in line with a predetermined direction set as a reference, so as to allocate the instantaneous data to the prediction data based on at least magnitudes of the respectively corrected velocities.

9 Claims, 11 Drawing Sheets

RADAR APPARATUS AND TARGET DETECTING METHOD

CROSS-REFERENCE TO RELATED APPLICATIONS

This application is based on and claims priority under 35 USC 119 from Japanese Patent Application No. 2018-111083 filed on Jun. 11, 2018.

FIELD OF THE INVENTION

An embodiment of the present invention relates to a radar apparatus and a target detecting method.

BACKGROUND OF THE INVENTION

In the background art, there has been known a radar apparatus which calculates relative velocity of instantaneous data based on a transmission wave and a reflection wave in which the transmission wave is reflected, and detects a target based on the calculated relative velocity of the instantaneous data (e.g. see JP-A-2002-14165).

SUMMARY OF THE INVENTION

However, in the radar apparatus, there may be a difference in relative velocity between instantaneous data obtained from one and the same target due to a difference between reflection points of the instantaneous data. Accordingly, there is a fear that relative velocity of instantaneous data from a target may deviate from predicted relative velocity of the target. Therefore, there is a fear that the radar apparatus according to the background art cannot allocate instantaneous data to predicted target data, so that trackability of the target may be lowered.

An embodiment of the present invention has been accomplished in consideration of the aforementioned circumstances. An object of the embodiment is to provide a radar apparatus and a target detecting method which improve trackability of a target.

The radar apparatus according to an aspect of the embodiment is provided with a detection portion and an allocation portion. The detection portion transmits a radio wave to a target and receives a radio wave reflected on the target so as to detect instantaneous data. The allocation portion allocates the instantaneous data to prediction data of the target so as to take continuity of the target. In addition, the allocation portion corrects velocity of the instantaneous data and velocity of the prediction data respectively as velocities made in line with a predetermined direction set as a reference, so as to allocate the instantaneous data to the prediction data based on at least magnitudes of the respectively corrected velocities.

According to the embodiment, it is possible to improve trackability of a target.

DETAILED DESCRIPTION OF THE INVENTION

A radar apparatus and a target detecting method disclosed by the present invention will be described below with reference to the accompanying drawings. Incidentally, this invention is not limited by the following embodiment. In addition, although description will be made below in a case where the radar apparatus 1 uses an FM-CW (Frequency Modulated Continuous Wave) technique by way of example, the radar apparatus 1 may use another technique such as an FCM (Fast-Chirp Modulation) technique.

The radar apparatus 1 is, for example, mounted on a vehicle MC to detect a target (e.g. a preceding vehicle, a standstill object such as a bicycle, a person or a guard rail, or the like) present in the surroundings of the vehicle MC. Incidentally, the radar apparatus 1 may be used for various applications (e.g. surveillance etc. of an airplane or a vessel) other than the on-vehicle radar apparatus.

Figure 1:
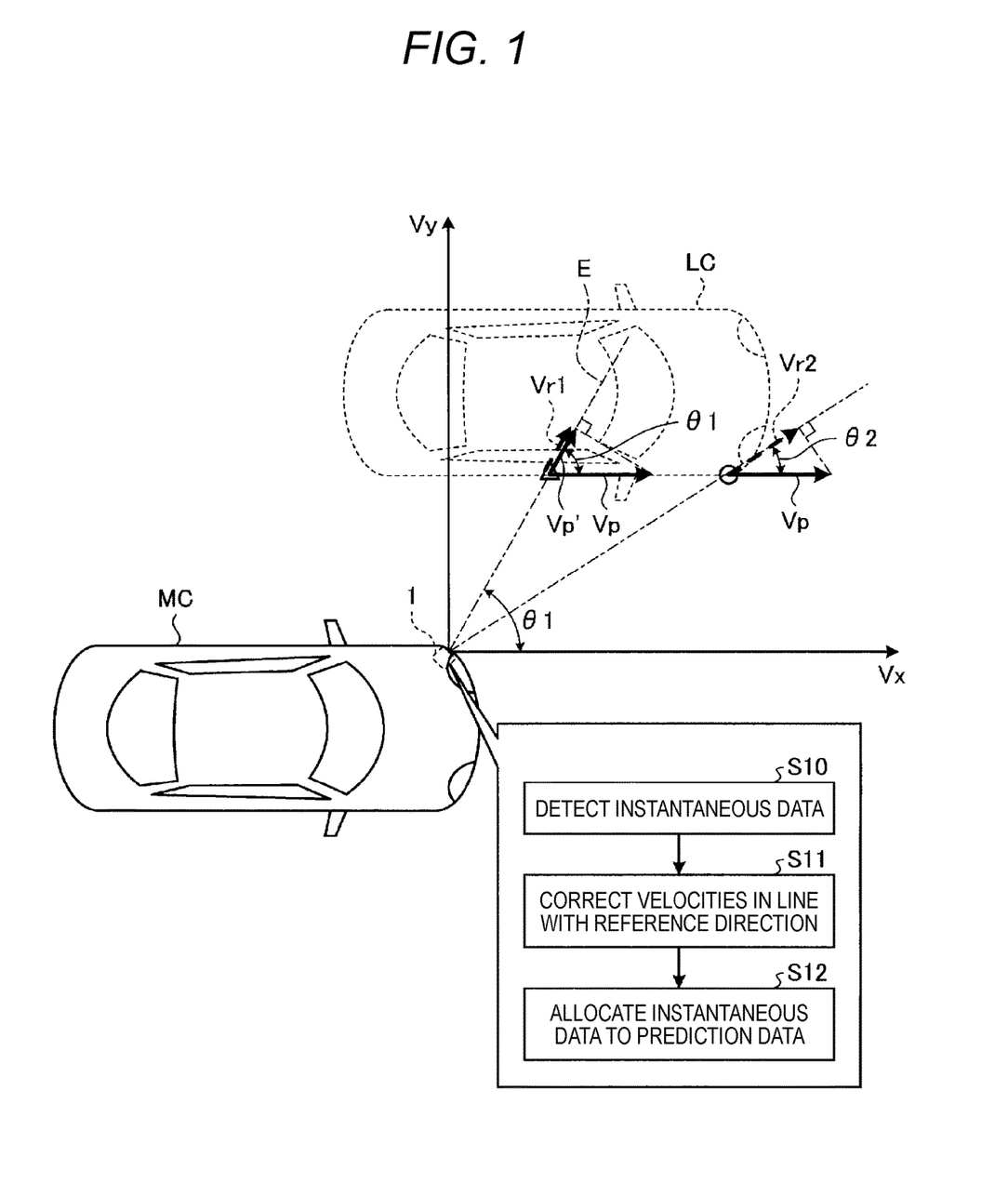
FIG. 1 is a view showing an outline of a target detecting method according to an embodiment.

First, an outline of the target detecting method according to the embodiment will be described with reference to FIG. 1. FIG. 1 is a view showing the outline of the target detecting method according to the embodiment. In FIG. 1, another vehicle LC travelling side by side with the vehicle MC is shown as a target to be tracked, that is present in the surroundings of the vehicle MC, by way of example.

The radar apparatus 1 detects instantaneous data having information about a position of a reflection point at which a transmission wave has been reflected on the target or relative velocity, based on the transmission wave and a reception wave (S10). In addition, the radar apparatus 1 generates prediction data in which a position or velocity of the target at a current measurement time instant has been predicted from past target data. In FIG. 1, prediction data is designated by "○" on the assumption that the prediction data has been predicted in the vicinity of a front of a right side surface of the other vehicle LC. In addition, in FIG. 1, instantaneous data is designated by "Δ" on the assumption that the instantaneous data has been detected in the vicinity of a center of the right side surface of the other vehicle LC.

The prediction data includes values in which a movement destination of target data generated in a last period (scan) has been predicted by a predetermined process. The prediction data includes a relative position relation, velocity, etc. to the radar apparatus 1. The relative position relation may be also expressed by a distance and an azimuth to the radar apparatus 1. In FIG. 1, assume that a direction of the velocity Vp of the prediction data is parallel with an axis Vx.

In a similar manner or the same manner, the instantaneous data also has the reflection point, and the relative position relation, the relative velocity, etc. to the radar apparatus 1. The relative position relation may be also expressed by a distance and an azimuth to the radar apparatus 1. Incidentally, the instantaneous data may be also called observation values. In FIG. 1, the azimuth of the instantaneous data is expressed as an angle θ1 in a horizontal plane. "θ1" is an angle between the axis Vx parallel with a travelling direction of the vehicle MC and a line connecting the instantaneous data and the radar apparatus 1 to each other. In addition, a direction of relative velocity Vr1 of the instantaneous data is a direction toward the radar apparatus 1. An angle of the relative velocity Vr1 of the instantaneous data is "θ1".

The radar apparatus 1 corrects the velocity of the instantaneous data and the velocity of the prediction data respectively as velocities made in line with a predetermined direction E set as a reference (hereinafter referred to as "reference direction") (S11). The radar apparatus 1 performs correction to move the tip of a velocity vector to be corrected in a direction orthogonal to the direction of the velocity belonging to the instantaneous data to thereby make the velocity vector in line with the reference direction E.

For example, the radar apparatus 1 sets the direction of the relative velocity Vr1 of the instantaneous data as the reference direction E, and corrects the velocity Vp of the prediction data to thereby calculate corrected velocity Vp' of the prediction data in the reference direction E. The radar apparatus 1 uses the velocity Vp of the prediction data and the angle θ1 of the instantaneous data to calculate the corrected velocity Vp' (|Vp'|=|Vp| cos θ1) of the prediction data.

The radar apparatus 1 allocates the instantaneous data to the prediction data based on at least magnitudes of the respectively corrected velocities (S12).

For example, the radar apparatus 1 allocates the instantaneous data corresponding to the other vehicle LC to the prediction data based on the magnitude of the corrected velocity Vp' of the prediction data and magnitude of the relative velocity Vr1 of the instantaneous data.

The radar apparatus 1 allocates, to the prediction data, the instantaneous data with a small difference between the magnitude of the corrected velocity Vp' of the prediction data and the magnitude of the relative velocity Vr1 of the instantaneous data. Incidentally, the radar apparatus 1 allocates the instantaneous data to the prediction data based on a distance between the instantaneous data and the prediction data, etc. in addition to the difference between the magnitudes of the velocities.

In a target detecting method according to the background art, a direction of relative velocity Vr2 of the velocity Vp of the prediction data is set as a direction toward the radar apparatus 1, so that the relative velocity Vr2 (=Vp cos θ2) of the prediction data can be calculated. In FIG. 1, an angle between the axis Vx parallel with the travelling direction of the vehicle MC and a line connecting the prediction data and the radar apparatus 1 to each other is designated by "θ2". In the target detecting method according to the background art, the instantaneous data is allocated to the prediction data based on a difference between magnitude of the relative velocity Vr2 of the prediction data and the magnitude of the relative velocity Vr1 of the instantaneous data.

Therefore, when a position of the prediction data and a position of the instantaneous data are separate from each other in the other vehicle LC, the difference between the magnitude of the relative velocity Vr2 of the prediction data and the magnitude of the relative velocity Vr1 of the instantaneous data is large. For example, when the reflection point of the reflection wave changes in the other vehicle LC, i.e. when so-called reflection point movement occurs, the difference between the magnitude of the relative velocity Vr2 of the prediction data and the magnitude of the relative velocity Vr1 of the instantaneous data increases.

Thus, there is a fear that the instantaneous data may not be allocated to the prediction data even in the case where the instantaneous data belongs to the other vehicle LC. That is, there is a fear that the radar apparatus using the target detecting method according to the background art cannot take continuity of the target.

On the other hand, the radar apparatus 1 according to the embodiment corrects the relative velocity Vr1 of the instantaneous data and the velocity Vp of the prediction data as velocities made in line with the reference direction E. The radar apparatus 1 allocates the instantaneous data to the prediction data based on at least the magnitudes of the corrected velocities.

Therefore, the radar apparatus 1 can suppress the difference between the magnitudes of the velocities of the instantaneous data and the prediction data of the other vehicle LC from increasing, and allocate the instantaneous data detected from the other vehicle LC to the prediction data. That is, the radar apparatus 1 can take continuity of the target and improve trackability of the target.

Figure 2:
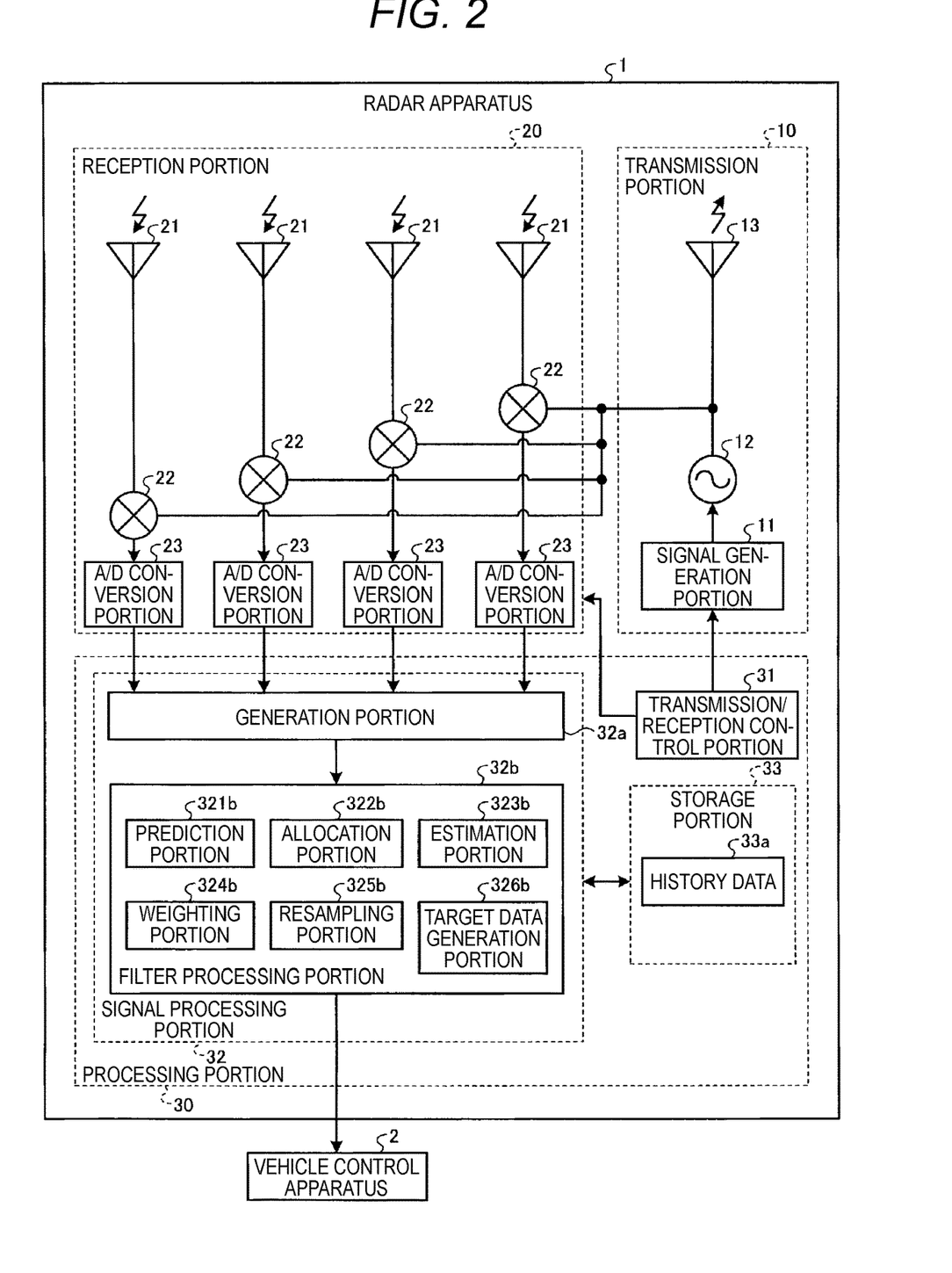
FIG. 2 is a block diagram showing the configuration of a target apparatus according to the embodiment.

Next, the configuration of the radar apparatus 1 according to the embodiment will be described in detail with reference to FIG. 2. FIG. 2 is a block diagram showing the configuration of the radar apparatus 1 according to the embodiment. Incidentally, constituent elements of the radar apparatus 1 required for explaining characteristics of the embodiment are mainly expressed by functional blocks in FIG. 2, and description about general constituent elements of the radar apparatus 1 may be omitted.

In other words, the respective constituent elements shown in FIG. 2 are functionally conceptual and do not have to be always physically configured as illustrated. For example, a specific form about how to disperse or integrate the function blocks is not limited to the illustrated one. The whole or a portion of the functional blocks can be configured to be functionally or physically dispersed/integrated by any units in accordance with various loads, usage conditions, etc.

As shown in FIG. 2, the radar apparatus 1 is provided with a transmission portion 10, a reception portion 20, and a processing portion 30. The radar apparatus 1 is connected to a vehicle control apparatus 2 controlling behavior of the vehicle MC (see FIG. 1).

The vehicle control apparatus 2 performs vehicle control of a PCS (Pre-crash Safety) system or an AEB (Advanced Emergency Braking) system based on a target detection result obtained by the radar apparatus 1.

The transmission portion 10 is provided with a signal generation portion 11, an oscillator 12, and a transmission antenna 13. The signal generation portion 11 generates a modulation signal for transmitting a millimeter wave whose frequency has been modulated by a triangular wave, by control of a transmission/reception control portion 31 that will be described later. The oscillator 12 generates a transmission signal based on the modulation signal generated by the signal generation portion 11, and outputs the generated transmission signal to the transmission antenna 13. Incidentally, as shown in FIG. 2, the transmission signal generated by the oscillator 12 is also distributed to mixers 22 that will be described later.

The transmission antenna 13 converts the transmission signal sent from the oscillator 12 into a transmission wave, and outputs the transmission wave to the outside of the vehicle MC. The transmission wave outputted by the transmission antenna 13 is a continuous wave whose frequency has been modulated by the triangular wave. The transmission wave transmitted from the transmission antenna 13 to the outside of the vehicle MC, e.g. to the front is reflected by the target such as the other vehicle LC to be thereby a reflection wave.

The reception portion 20 is provided with reception antennas 21 that form an array antenna, the mixers 22, and A/D conversion portions 23. One mixer 22 and one A/D conversion portion 23 are provided for each of the reception antennas 21.

Each of the reception antennas 21 receives a reflection wave from the target as a reception wave, converts the reception wave into a reception signal, and outputs the converted reception signal to the mixer 22. Incidentally, although the number of the reception antennas 21 shown in FIG. 2 is four, the number of the reception antennas 21 may be not higher than three or may be not lower than five.

After being amplified by a not-shown amplifier (e.g. a low noise amplifier), the reception signal outputted from the reception antenna 21 is inputted to the mixer 22. The mixer 22 partially mixes the distributed transmission signal and the reception signal inputted from the reception antenna 21 while removing unnecessary signal components. As a result, the mixer 22 generates a beat signal, and outputs the generated beat signal to the A/D conversion portion 23.

The beat signal has a beat frequency as a difference between a frequency of the transmission signal (hereinafter referred to as "transmission frequency") and a frequency of the reception signal (hereinafter referred to as "reception frequency"). After timings have been synchronized with one other among the reception antennas 21 by a not-shown synchronization portion, the beat signals generated by the mixers 22 are converted into digital signals by the A/D conversion portions 23 respectively, and then outputted to the processing portion 30.

The processing portion 30 is provided with the transmission/reception control portion 31, a signal processing portion 32, and a storage portion 33. The signal processing portion 32 is provided with a generation portion 32a and a filter processing portion 32b.

The storage portion 33 stores history data 33a. The history data 33a is information including a history of target data or a history of instantaneous data in a series of signal processings executed by the signal processing portion 32.

The processing portion 30 is, for example, a microcomputer including a CPU (Central Processing Unit), and an ROM (Read Only Memory), an RAM (Random Access Memory), a register, another I/O port, etc. corresponding to the storage portion 33. The processing portion 30 controls the radar apparatus 1 as a whole.

The CPU of the microcomputer reads and executes a program stored in the ROM, to thereby function as the transmission/reception control portion 31 and the signal processing portion 32. Incidentally, the transmission/reception control portion 31 and the signal processing portion 32 may be entirely constituted by hardware such as an ASIC (Application Specific Integrated Circuit) or an FPGA (Field Programmable Gate Array).

The transmission/reception control portion 31 controls the transmission portion 10 including the signal generation portion 11 and the reception portion 20. The signal processing portion 32 executes the series of signal processings periodically. Successively, the respective constituent elements of the signal processing portion 32 will be described.

The generation portion 32a generates instantaneous data. Specifically, the generation portion 32a performs a frequency analysis process, a peak extraction process, and an instantaneous data generation process to thereby generate the instantaneous data.

In the frequency analysis process, fast Fourier transform processing (hereinafter referred to as "FFT processing") is performed on the beat signal inputted from each of the A/D conversion portions 23. As a result of the FFT processing, a frequency spectrum of the beat signal is acquired including power values (signal levels) of the beat signal for respective frequencies (frequency bins set at a frequency interval in accordance with a frequency resolution) of the beat signal.

In the peak extraction process, peak frequencies as peaks in the result of the FFT processing by the frequency analysis process are extracted. Incidentally, in the peak extraction process, the peak frequencies are extracted for each of an "UP section" and a "DN section" of the beat signal as will be described later.

In the instantaneous data generation process, an angle estimation process is executed to calculate an arrival angle of the reflection wave corresponding to each of the peak frequencies extracted in the peak extraction process and a power value of the reflection wave at the peak frequency. Incidentally, at a point of time when the angle estimation process is executed, the arrival angle is an angle at which presence of a target is estimated. Hereinafter, the arrival angle may be simply referred to as "angle".

In addition, in the instantaneous data generation process, a pairing process is executed to determine a correct combination of the peak frequencies for each of the "UP section" and the "DN section" based on the calculation result of the calculated angles and the power values.

In addition, in the instantaneous data generation process, a distance of each target to the radar apparatus 1 and relative velocity in a direction toward the radar apparatus 1 are calculated from the determined combination result. In addition, in the instantaneous data generation process, the calculated angle, the calculated distance and the calculated relative velocity of each target are outputted as instantaneous data corresponding to a latest period (latest scan) to the filter processing portion 32b, and stored as history data 33a in the storage portion 33.

Figure 3:
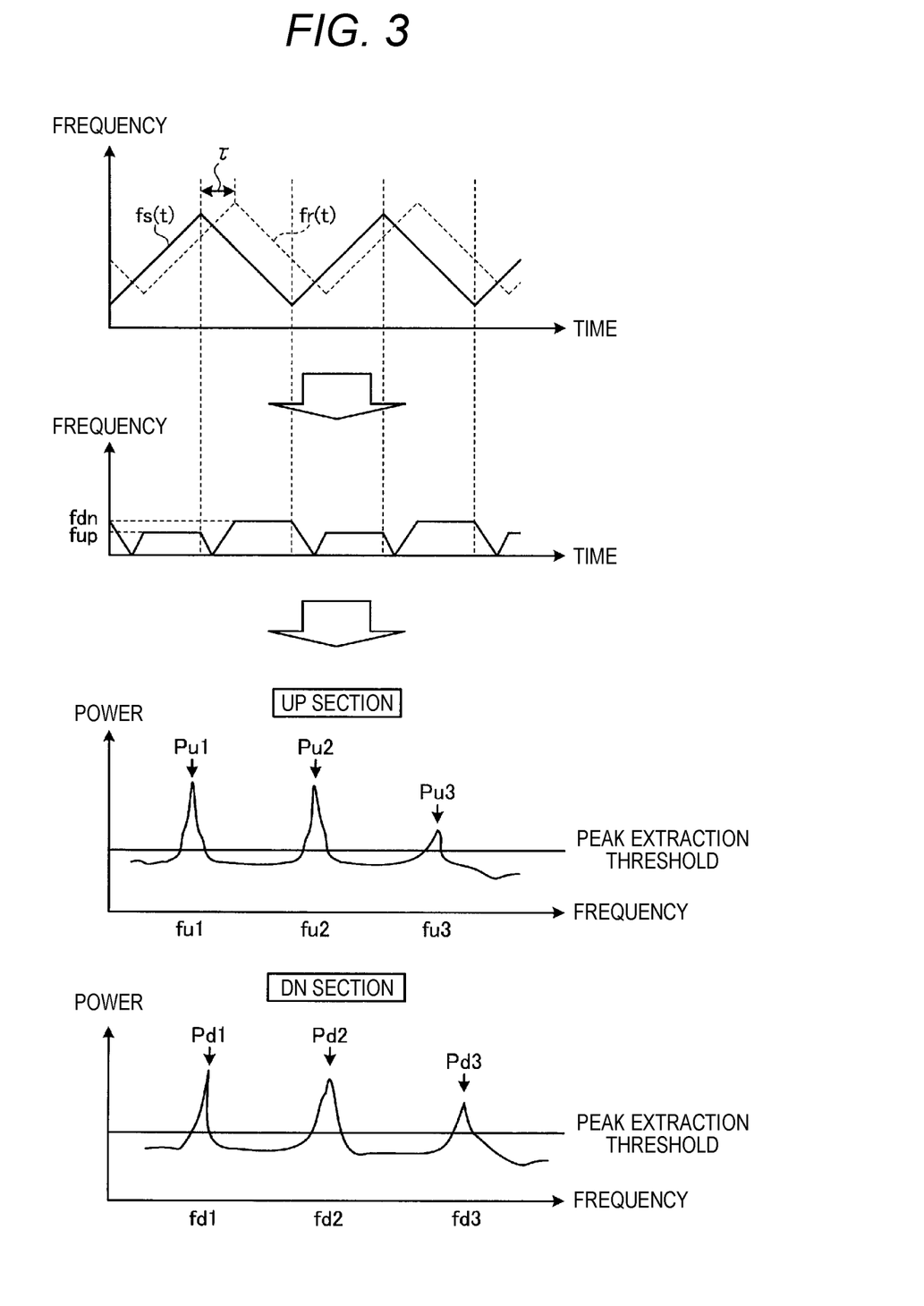
FIG. 3 is a process explanatory view from a process at a front stage of a signal processing portion to a peak extraction process in a generation portion.
Figure 4A:
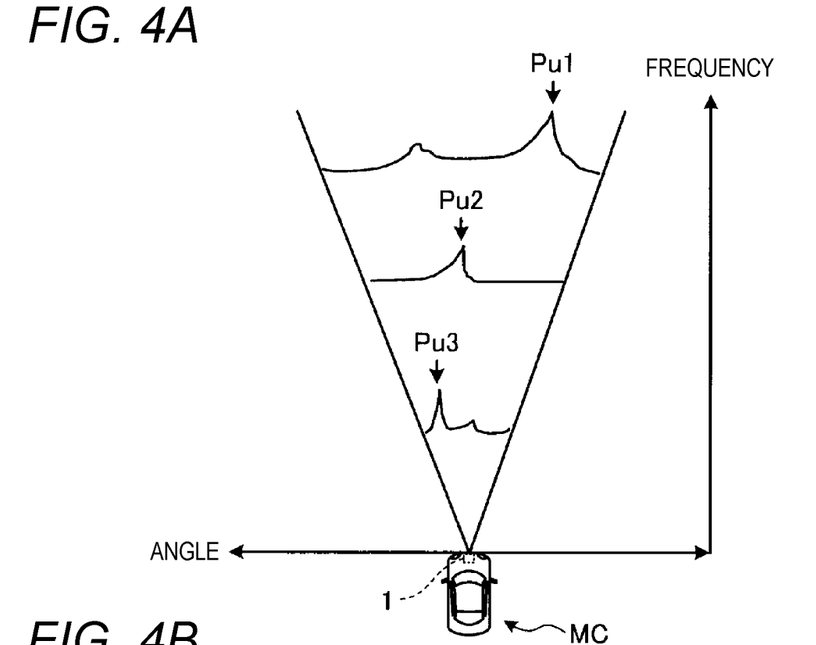
FIG. 4A is a process explanatory view of an angle estimation process.
Figure 4B:
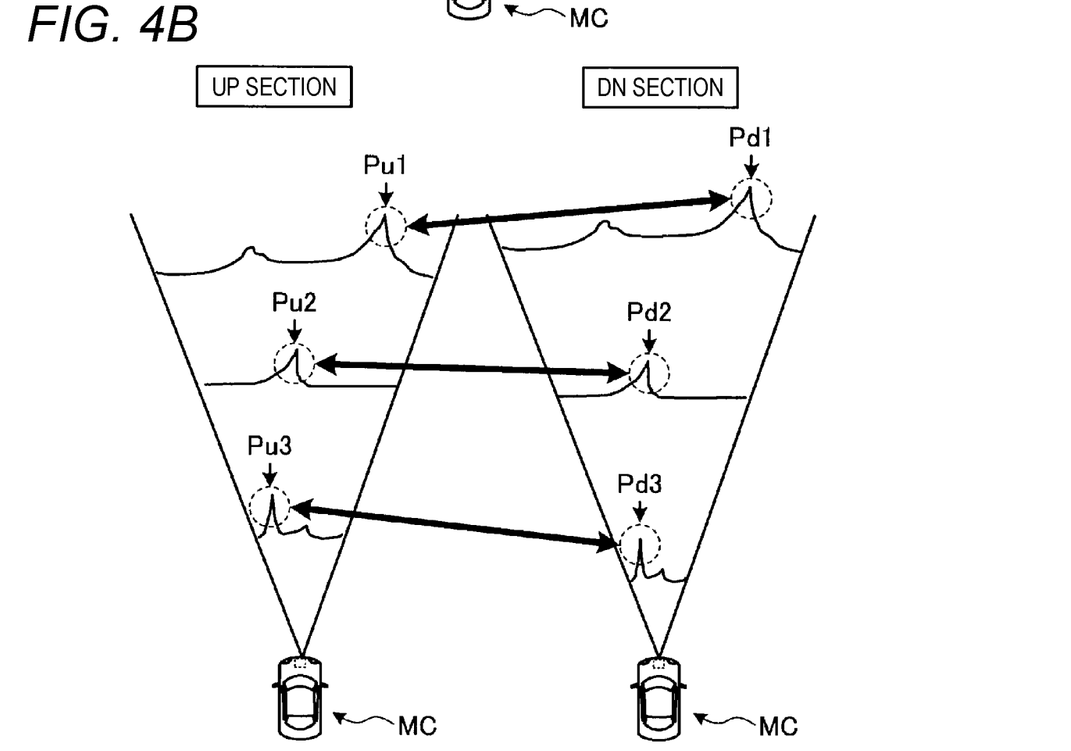
FIG. 4B is a process explanatory view of a pairing process (Part 1).
Figure 4C:
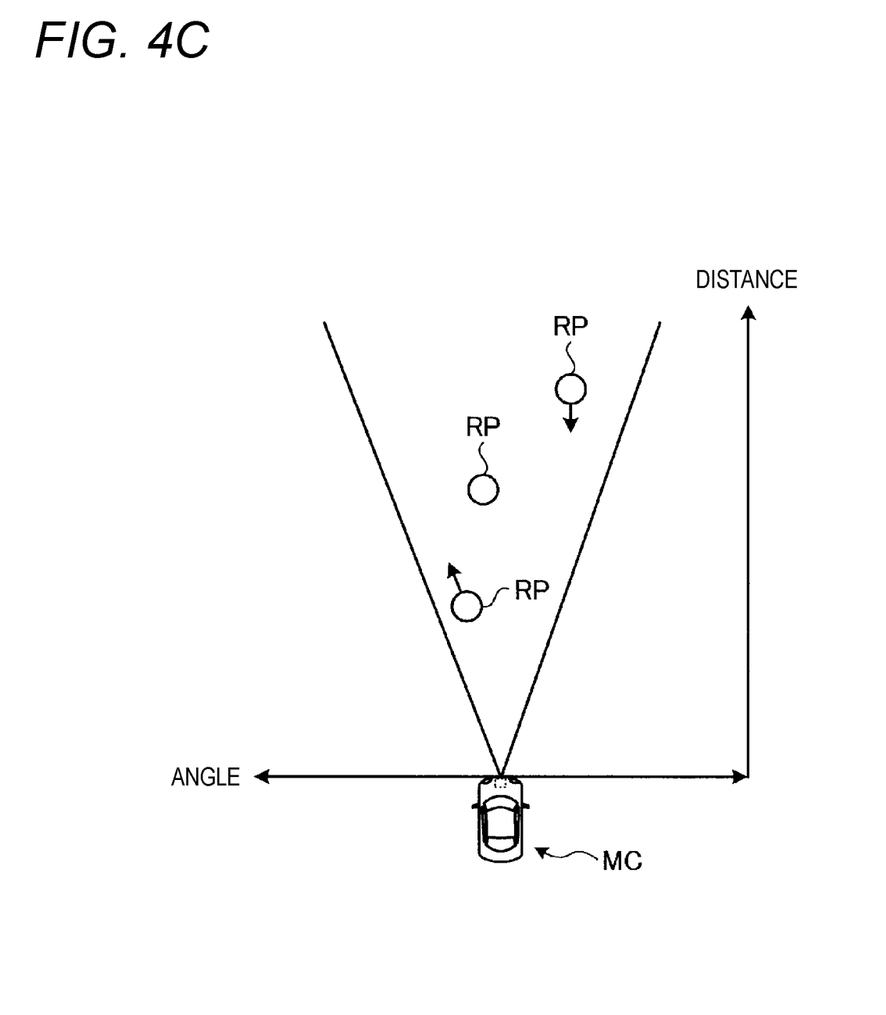
FIG. 4C is a process explanatory view of the pairing process (Part 2).

A flow from a process at a front stage of the signal processing portion 32 to the process performed so far in the signal processing portion 32 will be shown in FIGS. 3 to 4C in order to make the description easy to understand. FIG. 3 is a process explanatory view from the process at the front stage of the signal processing portion 32 to the peak extraction process in the generation portion 32a.

FIG. 4A is a process explanatory view of the angle estimation process. FIG. 4B and FIG. 4C are a process explanatory view (Part 1) and a process explanatory view (Part 2) of the pairing process. Incidentally, FIG. 3 is partitioned into three regions by two thick down arrows. The regions will be hereinafter sequentially referred to as upper stage, middle stage and lower stage respectively.

As shown in the upper stage of FIG. 3, a transmission signal fs(t) is sent out as a transmission wave from the transmission antenna 13. Then, the transmission signal fs(t) is reflected on each target to arrive as a reflection wave, and is received as a reception signal fr(t) in each reception antenna 21.

On this occasion, the reception signal fr(t) is delayed by a time difference τ from the transmission signal fs(t) in accordance with a distance between the vehicle MC and the target, as shown in the upper stage of FIG. 3. By the time difference τ and a Doppler effect based on relative velocity between the vehicle MC and the target, a beat signal is obtained as a signal in which a frequency fup of an "UP section" where the frequency rises and a frequency fdn of a "DN section" where the frequency drops are iterated (see the middle stage of FIG. 3).

In the lower stage of FIG. 3, a result in which the beat signal has been subjected to FFT processing in the frequency analysis process is schematically shown on each of the "UP section" side and the "DN section" side.

As shown in the lower stage of FIG. 3, a waveform in each of an "UP section" side frequency region and a "DN section" side frequency region is obtained after the FFT processing. In the peak extraction process, peak frequencies as peaks in the waveform are extracted.

For example, in the case of the example shown in the lower stage of FIG. 3, a peak extraction threshold is used, and peaks Pu1 to Pu3 are determined respectively as peaks and peak frequencies fu1 to fu3 are extracted respectively on the "UP section" side.

In addition, by use of the peak extraction threshold in the same manner, peaks Pd1 to Pd3 are determined respectively as peaks and peak frequencies fd1 to fd3 are extracted respectively on the "DN section" side.

Here, reflection waves from targets may be mixed in a frequency component of each of the peak frequencies extracted by the peak extraction process. To solve this problem, in the instantaneous data generation process, the angle estimation process is performed to calculate an azimuth about each of the peak frequencies, and presence of a target corresponding to each of the peak frequencies is analyzed.

Incidentally, the azimuth calculation in the instantaneous data generation process can be performed by use of a well-known arrival direction estimation technique such as ESPRIT (Estimation of Signal Parameters via Rotational Invariance Techniques).

FIG. 4A schematically shows a result of the azimuth calculation of the instantaneous data generation process. In the instantaneous data generation process, angles of targets (reflection points) corresponding to the peaks Pu1 to Pu3 respectively are calculated from the peaks Pu1 to Pu3 of the azimuth calculation result. In addition, magnitudes of the peaks Pu1 to Pu3 are power values. In the instantaneous data generation process, the angle estimation process is performed on the "UP section" side and the "DN section" side respectively, as shown in FIG. 4B.

In the instantaneous data generation process, a pairing process is performed to combine the peaks whose angles and power values are close to each other respectively in the azimuth calculation result. In addition, in the instantaneous data generation process, a distance to each of the targets (each of the reflection points) corresponding to each of the combinations of the peaks, and relative velocity in a direction toward the vehicle MC are calculated from the combination result.

The distance can be calculated based on a relation "distance ∝(fup+fdn)". The relative velocity can be calculated based on a relation "velocity ∝(fup−fdn)". As a result, a pairing process result indicating the instantaneous data of the angle, the distance and the relative velocity of each of the reflection points RP to the vehicle MC can be obtained, as shown in FIG. 4C.

Return to FIG. 2. The filter processing portion 32b will be described. As shown in FIG. 2, the filter processing portion 32b is provided with a prediction portion 321b, an allocation portion 322b, an estimation portion 323b, a weighting portion 324b, a resampling portion 325b and a target data generation portion 326b.

The filter processing portion 32b implements a particle filter for plotting a predetermined number of particles in a predetermined state space and analyzing a position relation in the state space to thereby generate target data. In the particle filter, a plurality of hypotheses are set up for a true state of the target, and analysis is made thereon. Each hypothesis is one assumed value about the state of the target, such as a position, velocity, etc. For example, in a position space, the hypotheses are scattered in a predetermined distribution and each of the hypotheses is observed as if it were a moving particle. Therefore, the hypotheses are also called particles. In addition, particle swarm data in which a predetermined number of particles are gathered as one hypothesis is also used. For example, the particle swarm data is an average value etc. of the states of the particles, which may be regarded as one hypothesis most likely in the distribution of the predetermined number of particles.

The prediction portion 321b performs a prediction process of each particle as a sample point and the particle swarm data in the particle filter. Specifically, the prediction portion 321b sets a latest period at a time instant $\underline{t}$ to predict the states of the particle and the particle swarm data at the time instant $\underline{t}$ based on the particle and the particle swarm data at a time instant t−1 of a last period. For example, there is a kinetic model, a technique for making prediction by a measurement period ΔT, etc., for example, based on the states (such as velocities or positions) of the particle and the particle swarm data. That is, the prediction portion 321b predicts the states of the particle and the particle swarm data at the time instant $\underline{t}$ from the past states of the particle and the particle swarm data in the prediction process.

The allocation portion 322b performs an allocation process for allocating instantaneous data to the particle swarm data. The allocation portion 322b allocates the instantaneous data in the latest period to the particle swarm data (prediction data) that is a prediction result of the prediction portion 321b.

Specifically, the allocation portion 322b determines whether the instantaneous data is allocated to the particle swarm data or not based on relevance between the particle swarm data and the instantaneous data. In the allocation, the allocation portion 322b calculates an evaluation value, i.e. cost based on a cost function based on the relevance, and allocates the instantaneous data to the particle swarm data based on the calculated cost.

The cost is calculated based on the position information and the velocity information of the particle swarm data, position information and velocity information of the instantaneous data, etc. As for the cost function, for example, differences between the aforementioned values may be normalized, and the sum of squares of the normalized differences may be used as the cost. The allocation portion 322b allocates the instantaneous data with small cost to the particle swarm data. Here, the "small cost" means that the degree of similarity between the instantaneous data and the particle swarm data is high. That is, the "small cost" means that there is a high possibility that the instantaneous data is allocated to the particle swarm data as a pair.

The allocation portion 322b allocates the instantaneous data with smallest cost to the particle swarm data. Incidentally, the allocation portion 322b may allocate the instantaneous data to the particle swarm data so as to minimize the total cost for all the particle swarm data. In addition, the allocation portion 322b may allocate pieces of instantaneous data to the particle swarm data.

In addition, an example in which the allocation portion 322b allocates data to each other with small cost has been described here. On the contrary, the allocation portion 322b may however calculate the cost based on the cost function and allocate the instantaneous data to the particle swarm data so as to allocate the data to each other with large cost.

The allocation portion 322b corrects the velocity of the instantaneous data or the particle swarm data and calculates the cost by use of the corrected velocity. The allocation portion 322b corrects the velocity of the instantaneous data and the velocity of the particle swarm data respectively as velocities made in line with a reference direction E.

The allocation portion 322b first sets the reference direction E for making a direction of relative velocity Vr1 (which may be hereinafter referred to as "velocity vector Vr1") of the instantaneous data in line with a direction of velocity Vp (which may be hereinafter referred to as "velocity vector Vp") of the particle swarm data. Incidentally, the reference direction E is, for example, a direction orthogonal to a front surface of the radar apparatus 1. Incidentally, the reference direction E is a direction not orthogonal to the relative velocity Vr1 of the instantaneous data.

Figure 5A:
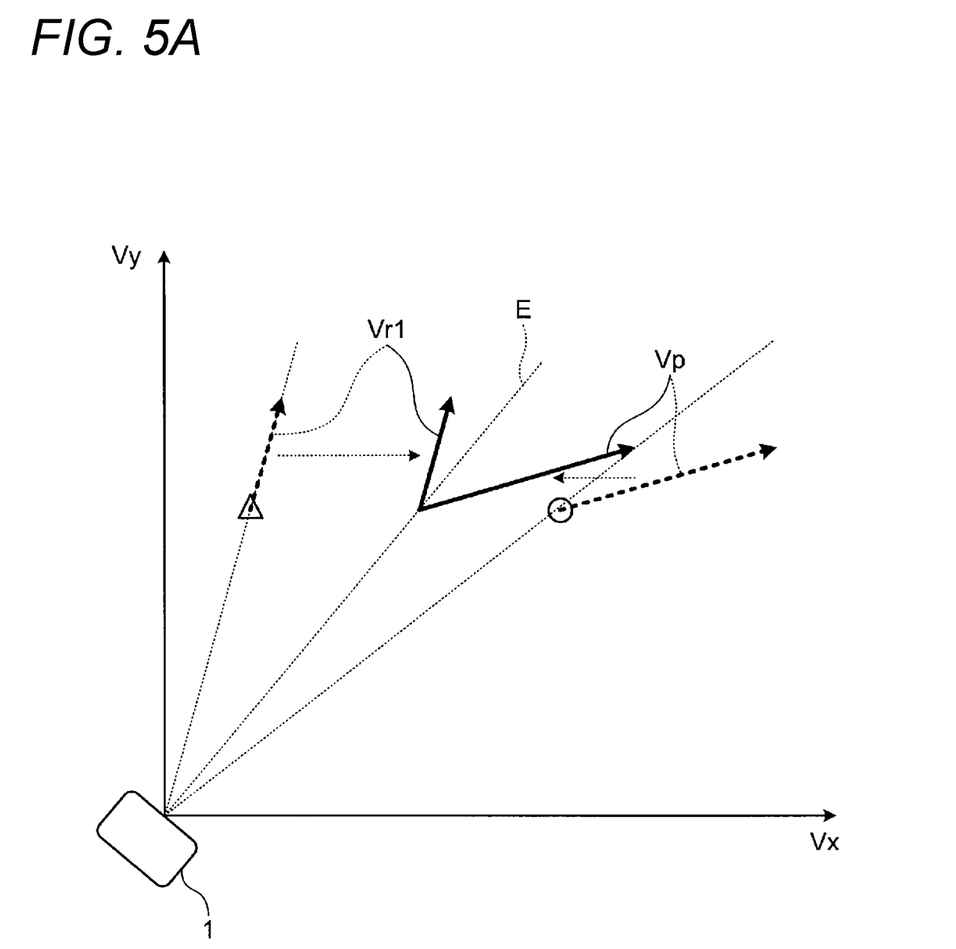
FIG. 5A is a view explaining velocity correction (Part 1).

As shown in FIG. 5A, the allocation portion 322b next moves the velocity vector Vr1 of the instantaneous data and the velocity vector Vp of the particle swarm data so that one and the same point on the reference direction E can be a base point. FIG. 5A is a view for explaining velocity correction (Part 1). In FIG. 5A, the particle swarm data are designated by "○" and the instantaneous data are designated by "Δ". A similar thing or the same thing will be also applied to the drawings used as follows. In addition, in FIG. 5A, the velocity vector Vr1 of the instantaneous data before movement and the velocity vector Vp of the particle swarm data before movement are indicated by a broken line. The velocity vector Vr1 of the instantaneous data after movement and the velocity vector Vp of the particle swarm data after movement are indicated by a solid line.

Figure 5B:
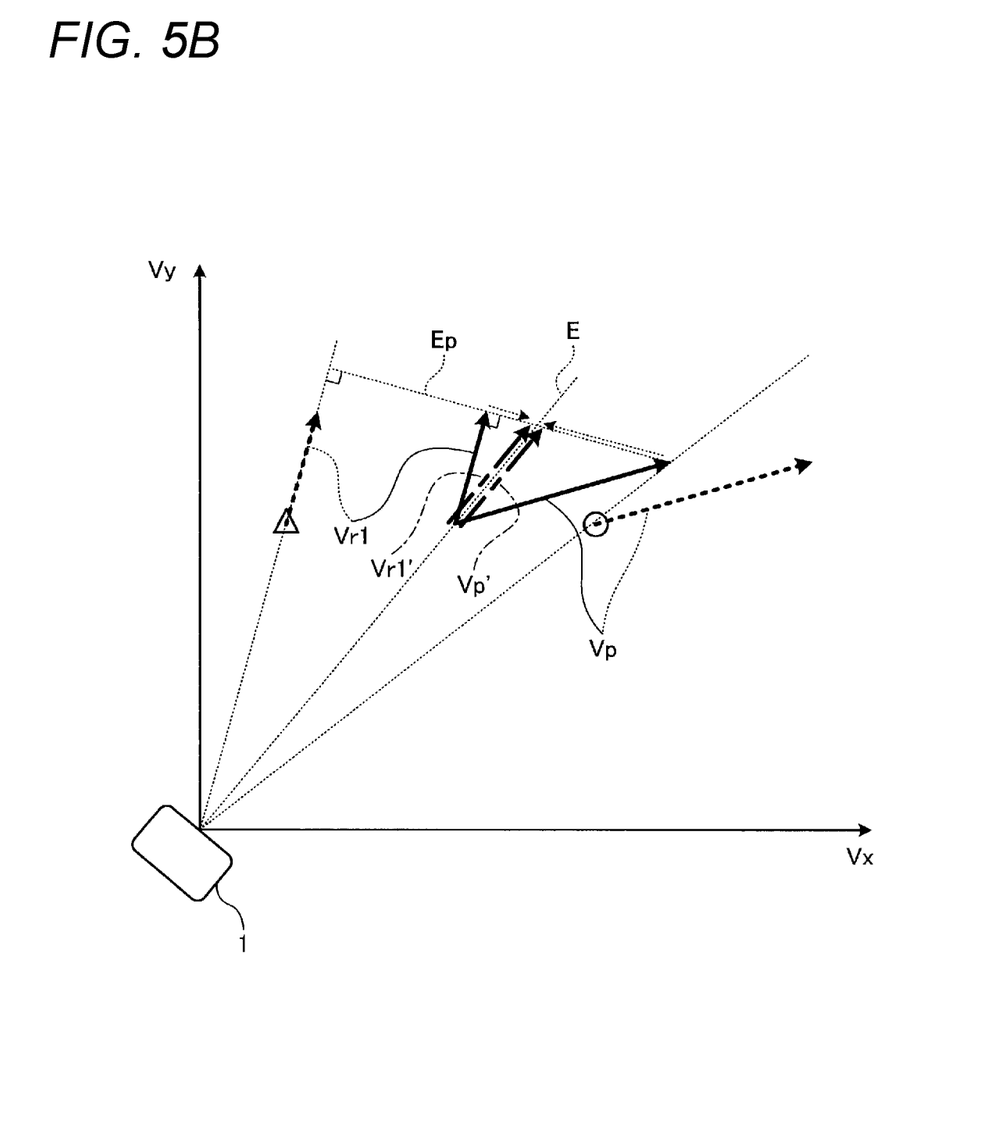
FIG. 5B is a view explaining the velocity correction (Part 2).

As shown in FIG. 5B, the allocation portion 322b moves the tip of the velocity vector Vr1 of the instantaneous data along a direction Ep orthogonal to a direction of the velocity vector Vr1 of the instantaneous data to correct the relative velocity Vr1 of the instantaneous data in line with the reference direction E to thereby calculate corrected relative velocity Vr1' of the instantaneous data. In addition, in a similar manner or the same manner, the allocation portion 322b moves the tip of the velocity vector Vp of the particle swarm data to correct the velocity Vp of the particle swarm data in line with the reference direction E to thereby calculate corrected velocity Vp' of the particle swarm data. FIG. 5B is a view for explaining the velocity correction (Part 2). In FIG. 5B, the corrected velocity vector Vr1' of the instantaneous data made in line with the reference direction E and the corrected velocity vector Vp' of the particle swarm data made in line with the reference direction E are indicated by a one-dot chain line. In addition, in FIG. 5B, the corrected velocity vector Vr1' of the instantaneous data and the corrected velocity vector Vp' of the particle swarm data are illustrated to be slightly shifted from the reference direction E for the sake of explanation.

Figure 6:
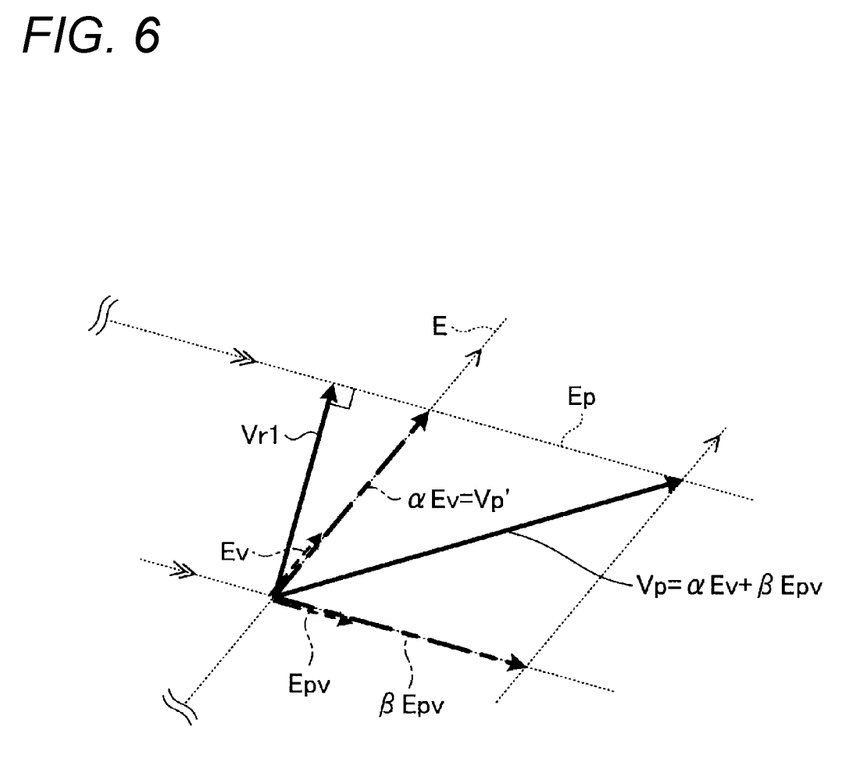
FIG. 6 is a view in which a velocity vector of particle swarm data shown in FIG. 5B has been decomposed in a predetermined basis system.

To explain in detail, the aforementioned correction means that the vector of the velocity to be corrected is decomposed in a predetermined basis system (E, Ep). That is, the aforementioned correction is a process for obtaining $\alpha$ and $\beta$ satisfying $Vp = \alpha Ev + \beta Epv$ for the uncorrected velocity vector Vp of the particle swarm data, for example, as shown in FIG. 6. "Ev" designates a unit vector in the reference direction E. "Epv" designates a unit vector in a direction orthogonal to the velocity vector Vr1 of the instantaneous data, i.e. in Ep. FIG. 6 is a view in which the velocity vector Vp of the particle swarm data shown in FIG. 5B is decomposed in the predetermined basis system. According to such vector decomposition, magnitude of the velocity Vp' of the particle swarm data after the correction is "$\alpha|Ev|$".

When the predetermined basis system is a normal basis system ($|Ev|=|Epv|=1$), as described above, the magnitude of the velocity Vp' of the particle swarm data after correction, i.e. made in line with the reference direction E is "$\alpha$". Incidentally, "$\alpha$" and "$\beta$" can be calculated by use of various well-known techniques, for example, by solving a simultaneous equation.

Thus, the allocation portion 322b corrects the relative velocity Vr1 of the instantaneous data and the velocity Vp of the particle swarm data in line with the reference direction E to calculate the relative velocity Vr1' of the instantaneous data after the correction and the velocity Vp' of the particle swarm data after the correction.

Here, a modification of the velocity correcting method in the allocation portion 322b will be described. The allocation portion 322b may correct the velocities by the following method besides the aforementioned method.

Figure 7:
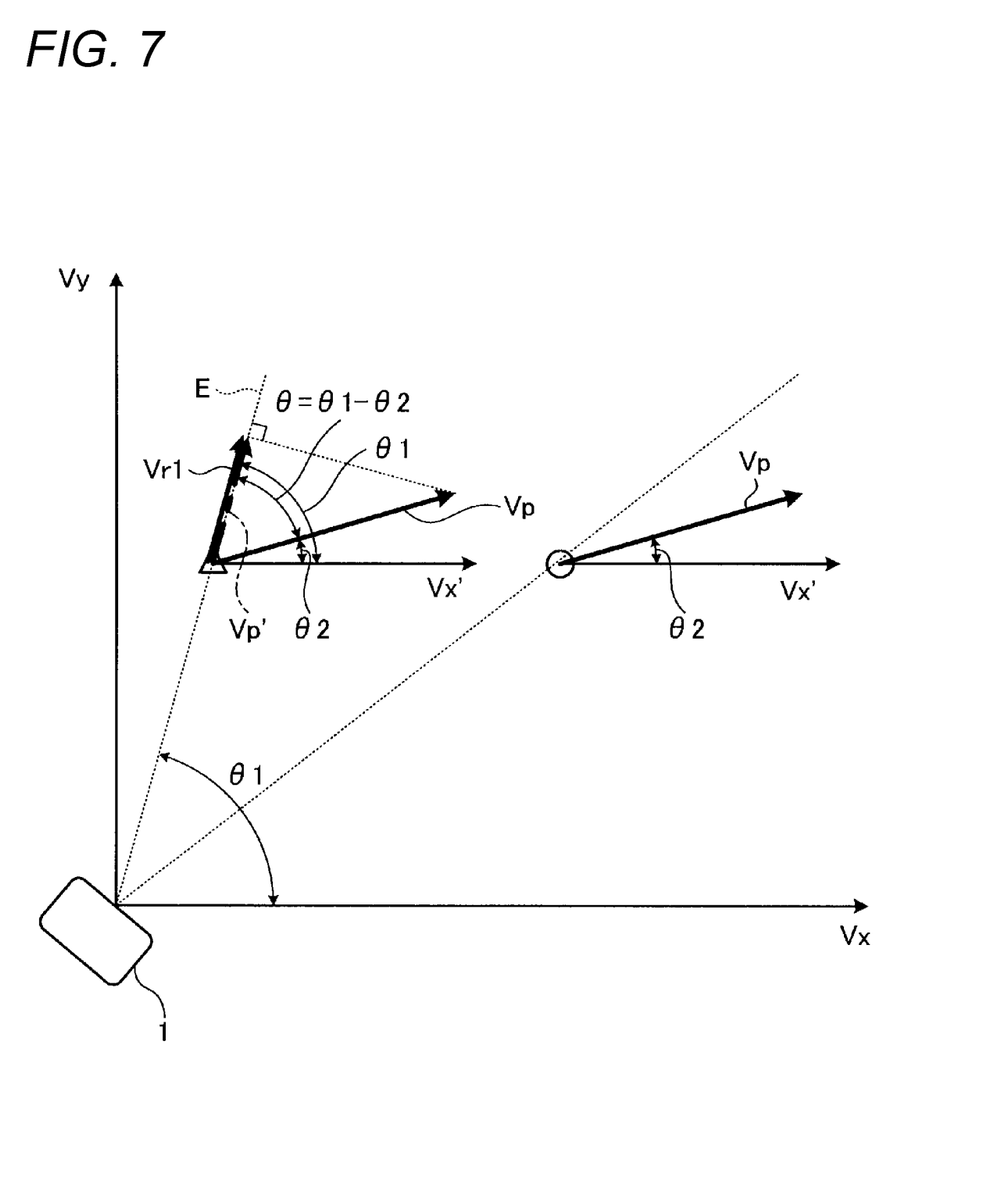
FIG. 7 is a view for explaining velocity correction when a reference direction has been made consistent with a direction of a velocity vector of instantaneous data.

The allocation portion 322b may set the reference direction E to be parallel with (e.g. consistent with) the direction of the velocity vector Vr1 of the instantaneous data, as shown in FIG. 7. FIG. 7 is a view for explaining velocity correction when the reference direction E has been made consistent with the direction of the velocity vector Vr1 of the instantaneous data. In FIG. 7, the velocity vector Vr1 of the instantaneous data is illustrated to be slightly shifted from the reference direction E for the sake of explanation.

In this case, magnitude of the velocity Vp' of the particle swarm data after the correction can be expressed by the following expression.

$$|Vp'| = Vr1 \cdot Vp / |Vr1| = |Vp| \cos \theta$$

"·" designates an inner product of the vectors. "θ" designates an angle between the velocity vector Vr1 of the instantaneous data and the velocity vector Vp of the particle swarm data before the correction. In FIG. 7, an angle of the velocity vector Vp of the instantaneous data before the correction is designated by "θ1", and an angle of the velocity vector Vp of the particle swarm data before the correction is designated by "θ2". Incidentally, "θ1" and "θ2" mean angles with respect to the axis Vx.

When the reference direction E has been made in line with the direction of the relative velocity Vr1 of the instantaneous data, the relative velocity Vr1 of the instantaneous data before the correction and the relative velocity Vr1' of the instantaneous data after the correction are equivalent to each other, so that the relative velocity Vr1 of the instantaneous data is unchanged before and after the correction. Therefore, as to the relative velocity Vr1 of the instantaneous data, the allocation portion 322b (1) may not calculate the relative velocity Vr1' of the instantaneous data after the correction, (2) may calculate the relative velocity Vr1' of the instantaneous data after the correction and use the relative velocity Vr1 of the instantaneous data before the correction, or (3) may calculate the relative velocity Vr1' of the instantaneous data after the correction and use the relative velocity Vr1' of the instantaneous data after the correction.

In the allocation portion 322b, the aforementioned techniques (1) to (3) can be suitably set for the relative velocity Vr1 of the instantaneous data. Normally, the aforementioned technique (1) is often used. However, to perform parallel execution for performing processes on a large number of pieces of data collectively, execution of the aforementioned technique (2) or (3) may be more advantageous than execution of the aforementioned technique (1).

Particularly, a tracking process using the particle filter has a processing structure suitable for the parallel execution. Therefore, execution of the aforementioned technique (2) or (3) is also effective in the tracking process using the particle filter.

Figure 8:
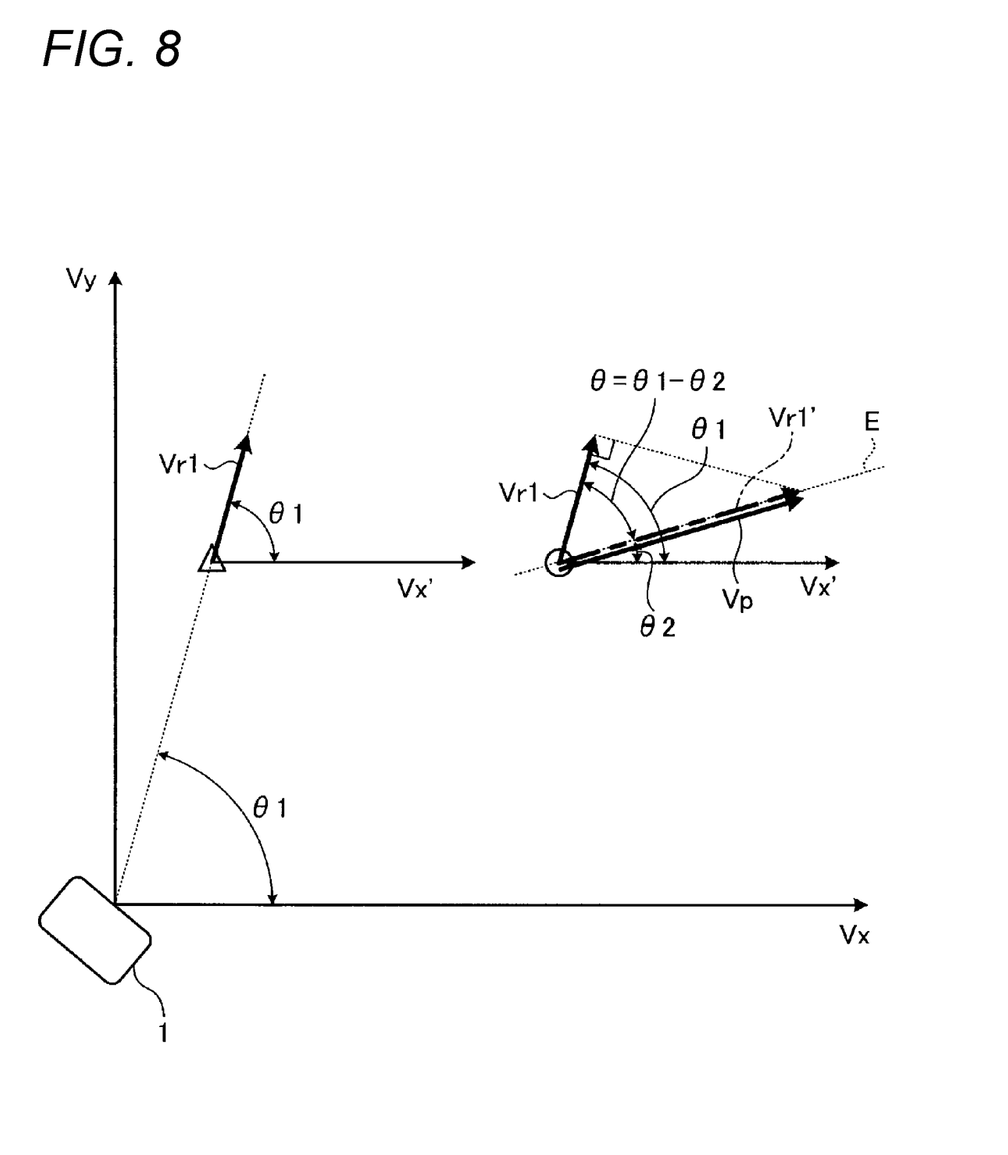
FIG. 8 is a view for explaining velocity correction when a reference direction has been made consistent with a direction of the velocity vector of the particle swarm data.

In addition, the allocation portion 322b may set the reference direction E to be parallel with (e.g. consistent with) the direction of the velocity vector Vp of the particle swarm data, as shown in FIG. 8. FIG. 8 is a view for explaining velocity correction when the reference direction E has been made consistent with the direction of the velocity vector Vp of the particle swarm data. In FIG. 8, the velocity vector Vp of the particle swarm data is illustrated to be slightly shifted from the reference direction E for the sake of explanation.

In this case, magnitude of the relative velocity Vr1' of the instantaneous data after correction can be expressed by the follow expression.

$$|Vr1'|=|Vr1|^2 \times |Vp|/(Vr1 \cdot Vp)=|Vr1|/\cos\theta$$

Incidentally, in this case, the velocity Vp of the particle swarm data before the correction and the velocity Vp' of the particle swarm data after the correction are equivalent to each other so that the velocity Vp of the particle swarm data is unchanged before and after the correction. Therefore, the allocation portion 322b can use the velocity Vp of the particle swarm data before the correction or the velocity Vp' of the particle swarm data after the correction in a similar manner to or the same manner as that in the case where the relative velocity Vr1 of the instantaneous data is unchanged before and after the correction.

In addition, the allocation portion 322b may use a non-normal non-orthogonal basis system in which |E| and |Ep| are not "1".

In addition, although two dimensions in a plane have been described here by way of example, velocity correction may be performed three-dimensionally. For example, the allocation portion 322b may perform vector decomposition in a three-dimensional basis system (E, Ep1, Ep2) to correct the velocities. For example, the velocity correction in the three dimensions is a process for obtaining α, β and γ satisfying Vp=αEv+βEp1v+γEp2v for the velocity Vp of the particle swarm data before the correction. Also in this case, magnitude of velocity Vp' of the particle swarm data after the correction is "α|Ev|" in a similar manner to or the same manner as the two dimensions. Incidentally, "Ep1" and a direction of the relative velocity Vr1 of the instantaneous data are orthogonal to each other, "Ep2" and the direction of the relative velocity Vr1 of the instantaneous data are orthogonal to each other, and "Ep1" and "Ep2" are not parallel with each other.

Even when the reference point varies, the magnitude of the velocity Vp' of the particle swarm data after the correction and the magnitude of the relative velocity Vr1 of the instantaneous data after the correction are consistent with each other for one and the same target moving at single velocity in an ideal case without any internally/externally caused error during detection, during prediction, etc. In addition, even when there is an error, a difference between the magnitude of the velocity Vp' of the particle swarm data after the correction and the magnitude of the relative velocity Vr1' of the instantaneous data after the correction is small. Accordingly, the allocation portion 322b can take continuity of the target.

Therefore, for example, even when reflection point movement occurs, the allocation portion 322b can reduce the difference between the magnitude of the relative velocity Vr1' of the instantaneous data after the correction and the magnitude of the velocity Vp' of the particle swarm data after the correction and take continuity of the target.

Thus, the allocation portion 322b can improve performance for tracking the target.

Incidentally, when there are instantaneous data that cannot be allocated to any of the particle swarm data, the allocation portion 322b treats the instantaneous data as a new target. After a predetermined process is applied to the new target, particle swarm data is generated and particles are also given simultaneously. The predetermined process may also stride over a measurement period. For example, after continuity of the new target in several periods is simply evaluated and it is confirmed that the new target occurs not sporadically due to noise etc., particle swarm data may be generated and particles may be given.

Return to FIG. 2. The weighting portion 324b performs weighting on each of the particles this time. Hereinafter, the instantaneous data allocated to the particle swarm data the particles belong to are called corresponding instantaneous data. The weighting portion 324b increases, of the particles this time, a weight of each particle similar to the corresponding instantaneous data, and reduces, of the particles this time, a weight of each particle not similar to the corresponding instantaneous data. Incidentally, the degree of the "similarity" mentioned herein is one relevance index between the particle and the corresponding instantaneous data. For example, the degree of the "similarity" means an evaluation value of a cost function described based on a position difference, a velocity difference, etc. This is conceptually similar to the cost function used by the allocation portion 322b. The description itself of the cost function may be shared or different. The evaluation value of the cost function may be used directly for the weight, or may be processed to be used for the weight.

Next, the resampling portion 325b relocates (resamples) the particles based on the weights of the particles. Specifically, the resampling portion 325b moves each particle small in weight to the neighborhood of the corresponding instantaneous data.

The target data generation portion 326b generates target data based on the particles this time relocated by the resampling portion 325b. Incidentally, the target data generation portion 326b may generate a probability density function from a particle distribution, generate target data based on the center of gravity of the particle distribution, or simply generate target data based on an average of the particles.

In addition, the target data generation portion 326b generates the target data based on the given particles as to the new target.

Figure 9:
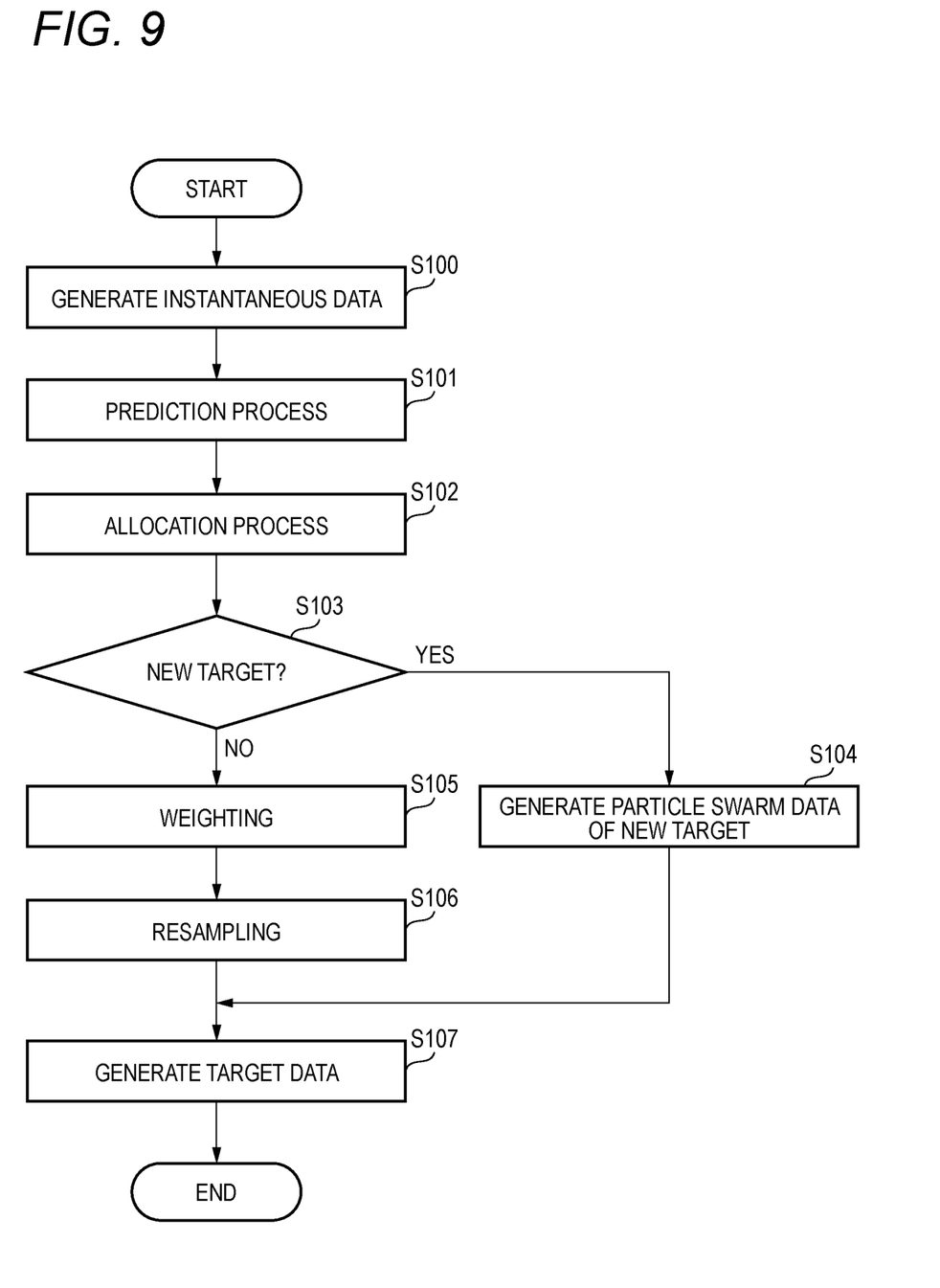
FIG. 9 is a flow chart showing a target data generation process.

Next, the target data generation process according to the embodiment will be described with reference to FIG. 9. FIG. 9 is a flow chart showing the target data generation process.

The radar apparatus 1 performs a frequency analysis process, a peak extraction process and an instantaneous data generation process to thereby generate instantaneous data (S100). The radar apparatus 1 performs a prediction process to predict states of particles and particle swarm data (S101).

The radar apparatus 1 performs an allocation process to allocate the instantaneous data to the particle swarm data (S102). The radar apparatus 1 makes a direction of relative velocity Vr1 of the instantaneous data in line with a direction of velocity Vp of the particle swarm data to, for example, calculate corrected relative velocity Vr1' of the instantaneous data and corrected velocity Vp' of the particle swarm data. The radar apparatus 1 allocates the instantaneous data to the particle swarm data based on magnitude of the corrected relative velocity Vr1' of the instantaneous data and magnitude of the corrected velocity Vp' of the particle swarm data.

The radar apparatus 1 determines whether the instantaneous data is data corresponding to a new target or not (S103). Incidentally, the radar apparatus 1 performs the determination for each instantaneous data to perform the following process.

When the instantaneous data is the data corresponding to the new target (S103: Yes), the radar apparatus 1 generates particle swarm data corresponding to the new target (S104) after performing a predetermined process.

When the instantaneous data is not the data corresponding to the new target (S103: No), the radar apparatus 1 performs weighting on the particles this time (S105).

The radar apparatus 1 performs resampling on the particles based on the weighting (S106). The radar apparatus 1 generates target data based on the resampled particles this time (S107). Incidentally, the radar apparatus 1 generates target data for the new target based on given particles.

The radar apparatus 1 corrects the relative velocity Vr1 of the instantaneous data and the velocity Vp of the particle swarm data respectively as velocities made in line with a reference direction E. Specifically, the radar apparatus 1 moves the tip of the velocity vector Vr1 of the instantaneous data and the tip of the velocity vector Vp of the particle swarm data in a direction orthogonal to the direction of the relative velocity Vr1 of the instantaneous data to thereby correct the relative velocity Vr1 of the instantaneous data and the velocity Vp of the particle swarm data in line with the reference direction E. The radar apparatus 1 allocates the instantaneous data to the particle swarm data based on at least the magnitude of the corrected relative velocity Vr1' of the instantaneous data and the magnitude of the corrected velocity Vp' of the particle swarm data.

Thus, the radar apparatus 1 can accurately allocate the instantaneous data of the target to be tracked, to the particle swarm data, take continuity of the target and improve tracking performance. For example, even when reflection point movement occurs in the target, the radar apparatus 1 can take continuity of the target and improve tracking performance.

A radar apparatus 1 according to a modification may set an allocatable range in accordance with each of kinds of targets. The radar apparatus 1 according to the modification determines a kind of a target, for example, based on a power value at a peak frequency, velocity of the target, etc. and sets an allocatable range in accordance with the kind of the target. Specifically, when the target is a vehicle, the radar apparatus 1 according to the modification sets the allocatable range wider than that when the target is a person. Here, allocation is not performed out of the allocatable range regardless of cost. That is, the allocatable range can be regarded as a maximum state range where the instantaneous data may appear.

The radar apparatus 1 according to the modification sets upper limits of a vertical position difference and a horizontal position difference between the instantaneous data and the particle swarm data based on the allocatable range. Although the allocatable range has been set here as for the position differences, the allocatable range is not limited thereto. The radar apparatus 1 according to the modification may also set the allocatable range as for another state such as a velocity difference.

The radar apparatus 1 according to the modification evaluates cost for the particle swarm data and the instantaneous data. Next, the radar apparatus 1 according to the modification determines whether the instantaneous data is present in the allocatable range or not based on position information of the instantaneous data and position information of the particle swarm data, and makes evaluation. When the instantaneous data is present in the allocatable range and evaluated to be able to be allocated, the radar apparatus 1 according to the modification allocates the instantaneous data to the particle swarm data. That is, the allocatable range can be also regarded as one evaluation index as to whether the instantaneous data can be allocated to the particle swarm data or not, in addition to the cost. In the flow of the aforementioned example, the cost is calculated before the determination of the allocatable range. However, the sequence thereof may be reverse. In addition, the determination of the allocatable range may be not provided as an individual process but incorporated into the cost. For example, processing may be performed alternatively as follows. That is, when the instantaneous data is out of the allocatable range, a penalty value is added to the cost so that the cost is higher out of the allocatable range to thereby prevent allocation from occurring.

Thus, the radar apparatus 1 according to the modification can prevent the instantaneous data out of the allocatable range from being allocated to the particle swarm data, and can suppress instantaneous data of a different target from being allocated to the particle swarm data. That is, the radar apparatus 1 according to the modification can improve performance for tracking the target.

The radar apparatus 1 according to the aforementioned embodiment uses the particle filter to generate target data and track the target. However, the present invention is not limited thereto. The radar apparatus 1 according to the modification may use an exponential moving average filter or a Kalman filter such as an extended Kalman filter or an unscented Kalman filter to generate target data and track the target.

Further effects or modifications can be derived easily by those skilled in the art. Therefore, a more extensive mode of the present invention is not limited to the specific details and the representative embodiment which have been shown and described above. Accordingly, various changes can be made without departing from the conceptual spirit or scope of the general invention defined by the scope of the accompanying Claims and equivalents thereto.

What is claimed is:

1. A radar apparatus comprising:
   a detection portion that transmits a radio wave to a target and receives a radio wave reflected on the target so as to detect instantaneous data; and
   an allocation portion that allocates the instantaneous data to prediction data of the target so as to take continuity of the target; wherein:
   the allocation portion corrects velocity of the instantaneous data and velocity of the prediction data respectively as velocities made in line with a predetermined direction set as a reference, so as to allocate the instantaneous data to the prediction data based on at least magnitudes of the respectively corrected velocities.

2. The radar apparatus according to claim 1, wherein:
the correction is performed to move a tip of a velocity vector serving as a subject of the correction in a direction orthogonal to a direction of the velocity belonging to the instantaneous data so as to make the velocity vector in line with the predetermined direction.

3. The radar apparatus according to claim 2, wherein:
the allocation portion sets a direction of relative velocity of the instantaneous data as the predetermined direction and performs the correction on the velocity of the prediction data.

4. The radar apparatus according to claim 2, wherein:
the allocation portion sets a direction of the velocity of the prediction data as the predetermined direction and performs the correction on relative velocity of the instantaneous data.

5. The radar apparatus according to claim 1, wherein:
the allocation portion sets at least an allocatable range for position information in accordance with a kind of the target, and
evaluates whether the instantaneous data is present or not within the allocatable range based on position information of the instantaneous data, position information of the prediction data and the allocatable range, and allocates the instantaneous data to the prediction data also based on a result of the evaluation.

6. The radar apparatus according to claim 2, wherein:
the allocation portion sets at least an allocatable range for position information in accordance with a kind of the target, and
evaluates whether the instantaneous data is present or not within the allocatable range based on position information of the instantaneous data, position information of the prediction data and the allocatable range, and allocates the instantaneous data to the prediction data also based on a result of the evaluation.

7. The radar apparatus according to claim 3, wherein:
the allocation portion sets at least an allocatable range for position information in accordance with a kind of the target, and
evaluates whether the instantaneous data is present or not within the allocatable range based on position information of the instantaneous data, position information of the prediction data and the allocatable range, and allocates the instantaneous data to the prediction data also based on a result of the evaluation.

8. The radar apparatus according to claim 4, wherein:
the allocation portion sets at least an allocatable range for position information in accordance with a kind of the target, and
evaluates whether the instantaneous data is present or not within the allocatable range based on position information of the instantaneous data, position information of the prediction data and the allocatable range, and allocates the instantaneous data to the prediction data also based on a result of the evaluation.

9. A target detecting method comprising:
transmitting a radio wave to a target and receiving a radio wave reflected on the target so as to detect instantaneous data; and
allocating the instantaneous data to prediction data of the target so as to take continuity of the target; wherein:
in the allocating, velocity of the instantaneous data and velocity of the prediction data are corrected respectively as velocities made in line with a predetermined direction set as a reference, and the instantaneous data is allocated to the prediction data based on at least magnitudes of the respectively corrected velocities.

* * * * *